United States Patent
Sosa

(10) Patent No.: US 11,879,515 B1
(45) Date of Patent: Jan. 23, 2024

(54) CENTRIFUGAL PENDULUM ABSORBER BUMPER

(71) Applicant: Schaeffler Technologies AG & Co. KG, Herzogenaurach (DE)

(72) Inventor: Juan Bernardo Sosa, Huejotzingo (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/961,620

(22) Filed: Oct. 7, 2022

(51) Int. Cl.
 *F16F 15/14* (2006.01)

(52) U.S. Cl.
 CPC ........ *F16F 15/145* (2013.01); *F16F 2222/08* (2013.01); *F16F 2230/007* (2013.01); *F16F 2232/02* (2013.01); *F16F 2236/08* (2013.01)

(58) Field of Classification Search
 CPC ................. F16F 15/145; F16F 2222/08; F16F 2230/007; F16F 2232/02; F16F 2236/08
 See application file for complete search history.

(56) References Cited

U.S. PATENT DOCUMENTS

| | | | |
|---|---|---|---|
| 8,881,622 B2 * | 11/2014 | Maienschein | F16F 15/145 74/574.2 |
| 9,709,126 B2 * | 7/2017 | Schnaedelbach | F16F 15/145 |
| 2015/0369334 A1 * | 12/2015 | Dinger | F16F 15/14 74/574.2 |

FOREIGN PATENT DOCUMENTS

| | | | | |
|---|---|---|---|---|
| DE | 1292987 B | * | 7/1963 | ............. F16D 69/00 |
| DE | 2108025 A1 | * | 2/1971 | ............. B65G 39/06 |
| GB | 592043 A | * | 9/1947 | ............... F16H 7/18 |

OTHER PUBLICATIONS

Machine translation of DE 2108025 A1, obtained from Espacenet (Year: 1972).*

* cited by examiner

*Primary Examiner* — Thomas C Diaz

(57) ABSTRACT

A centrifugal pendulum absorber includes a center plate arranged to receive a torque, a first pendulum connected to the center plate, a second pendulum mass connected to the center plate, and a resilient bumper disposed between the first and second pendulum masses. The first pendulum mass and the second pendulum mass axially bracket the center plate. The resilient bumper is connected to the first and second pendulum masses. The resilient bumper includes a core enclosed by a casing. The core is a metal and the casing is a polymer.

17 Claims, 7 Drawing Sheets

CENTRIFUGAL PENDULUM ABSORBER BUMPER

TECHNICAL FIELD

The present disclosure relates generally to a centrifugal pendulum absorber, and more specifically to a bumper of a centrifugal pendulum absorber.

BACKGROUND

A known centrifugal pendulum absorber includes resilient bumpers to soften contact between pendulum masses as the masses displace in reaction to rotation of the absorber. High rotational speeds of the absorber cause destructive deflection of and strain on the resilient bumpers.

SUMMARY

Embodiments of this disclosure provide a centrifugal pendulum absorber including a center plate arranged to receive a torque, a first pendulum connected to the center plate, a second pendulum mass connected to the center plate, and a resilient bumper disposed between the first and second pendulum masses. The first pendulum mass and the second pendulum mass axially bracket the center plate. The resilient bumper is connected to the first and second pendulum masses. The resilient bumper includes a core enclosed by a casing. The core is a metal and the casing is a polymer.

In embodiments, the centrifugal pendulum absorber may include a fastener fixedly connecting the first pendulum mass to the second pendulum mass. The resilient bumper may be disposed around the fastener. The casing may extend entirely about the fastener, and the core may extend partially about the fastener. The core may include a first end and a second end circumferentially spaced from each other about the fastener. The first and second ends may define a gap therebetween. A portion of the casing may fill the gap. When the center plate rotates beyond a threshold rotational speed, the first and second ends of the core may be arranged radially outward with respect to the fastener, and the resilient bumper may expand radially outwardly with respect to the fastener.

The core may include an inner wall extending about the fastener, an outer wall extending about the fastener and arranged radially outwardly of the inner wall with respect to the fastener, and a cavity disposed between the inner wall and the outer wall. The core may include a first end and a second end circumferentially spaced from each other about the fastener. The inner wall and the outer wall each may extend from the first end to the second end, and the cavity may be spaced from the first and second ends. A portion of the casing may fill the cavity.

Embodiments of this disclosure further provide a centrifugal pendulum absorber including a center plate arranged to receive a torque, a plurality of pairs of pendulum masses, and a plurality of resilient bumpers each including a core enclosed by a casing. Each pair of pendulum masses includes a first pendulum mass and a second pendulum mass axially bracketing the center plate. Each core is a metal, and each casing is a polymer. For each pair of pendulum masses, a first resilient bumper, included in the plurality of resilient bumpers, is connected to the first pendulum mass and to the second pendulum mass and extends past the first pendulum mass in a first circumferential direction. For each pair of pendulum masses, a second resilient bumper, included in the plurality of resilient bumpers, is connected to the first pendulum mass and to the second pendulum mass and extends past the first pendulum mass in a second circumferential direction, opposite the first circumferential direction.

In embodiments, the centrifugal pendulum absorber may include a plurality of fasteners fixedly connecting the first pendulum masses to the second pendulum masses. Each resilient bumper, included in the plurality of resilient bumpers, may be disposed around a respective fastener included in the plurality of fasteners. Each casing may extend entirely about the respective fastener, and each core may extend partially about the respective fastener. Each core may include a first end and a second end circumferentially spaced from each other about the respective fastener. Each core may include an inner wall extending about the respective fastener, and outer wall extending about the respective fastener and arranged radially outwardly of the inner wall with respect to the respective fastener, and a cavity disposed between the inner wall and the outer wall. Each core may include a first end and a second end circumferentially spaced from each other about the respective fastener. The inner walls and the outer walls each may extend from the respective first end to the respective second end, and the cavities each may be spaced from the respective first and second ends.

In embodiments, the first resilient bumper for each pair of pendulum masses may be radially aligned with one respective second resilient bumper for another pair of pendulum masses.

Embodiments of this disclosure further provide a resilient bumper for a centrifugal pendulum absorber. The resilient bumper includes a casing and a core. The casing is configured to extend entirely around a fastener. The casing is a polymer. The core is enclosed by the casing and is configured to extend partially around the fastener. The core is a metal.

In embodiments, the core may include a first end and a second end configured to be circumferentially spaced from each other about the fastener. The first and second ends may define a gap therebetween. A portion of the casing may fill the gap. The core may include an inner wall configured to extend about the fastener from the first end to the second end, an outer wall configured to extend about the fastener from the first end to the second end and arranged radially outwardly of the inner wall with respect to the fastener, and a cavity disposed radially between the inner wall and the outer wall with respect to the fastener. A portion of the casing may fill the cavity.

DETAILED DESCRIPTION

Figure 1:
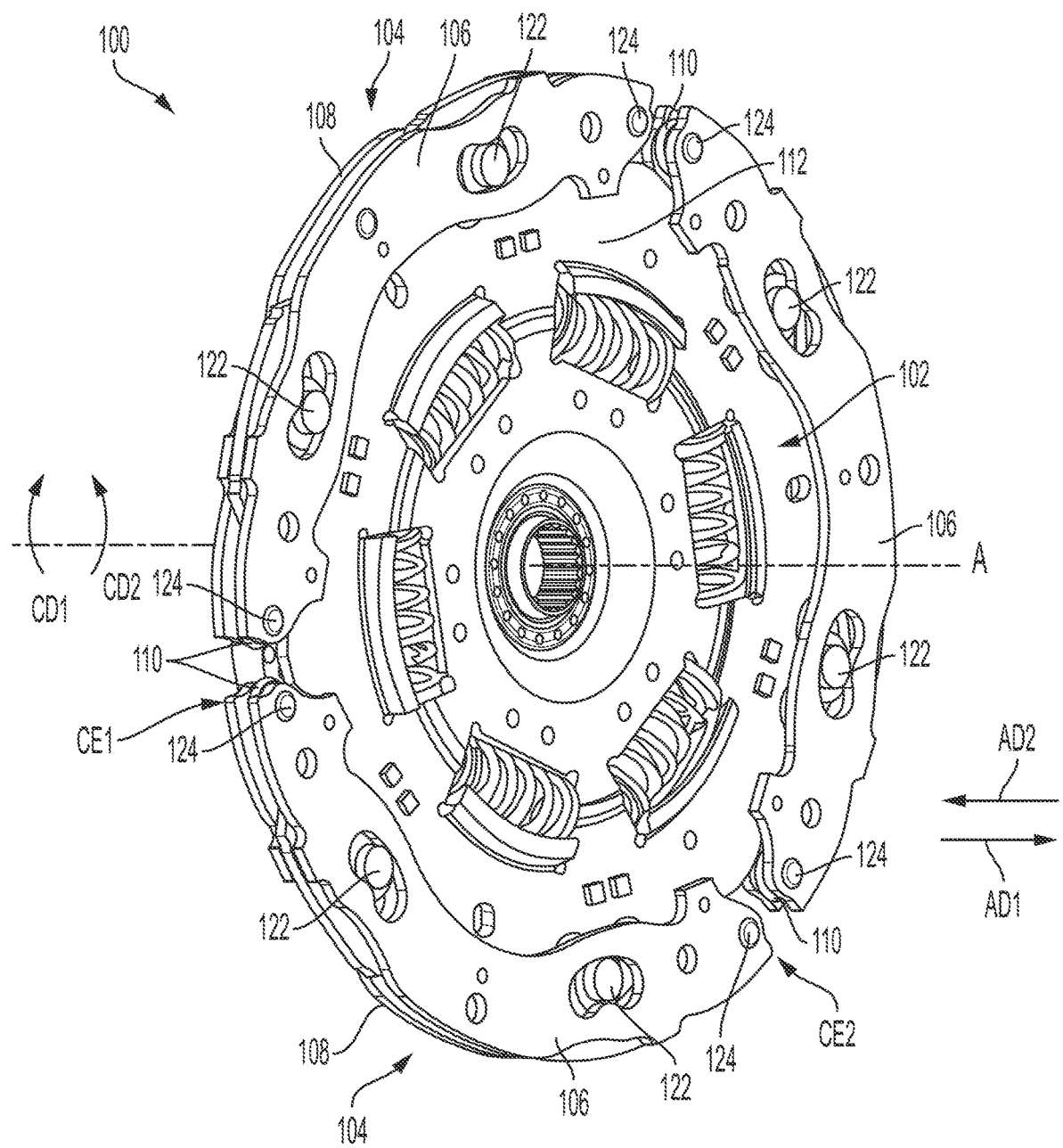
FIG. 1 illustrates a perspective view of a centrifugal pendulum absorber with a resilient bumper.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

In some centrifugal pendulum absorber arrangements, a plurality of resilient bumpers may deform due to centrifugal effects at rotational speeds of the centrifugal pendulum above a threshold, which can decrease impact absorption capabilities of the resilient bumpers. Additionally, when subjected to impact forces above a threshold, the plurality of resilient bumpers may be unable to absorb the impact forces such that pairs of pendulum masses impact each other, which can increase a likelihood of damage to the pairs of pendulum masses. Embodiments described herein provide a resilient bumper with a metal core enclosed by a polymer casing. Embodiments according to the present disclosure provide several advantages including limiting outward deflection of the resilient bumpers, which prevents strain on and damage to the resilient bumpers from excessive outward deflection. Additionally, the metal core reinforces the polymer casing, which increases impact absorption capabilities of the resilient bumpers. Thus, the durability and service life of resilient bumpers are increased, contributing to an increase in the durability and service life of centrifugal pendulum absorber.

Figure 2:
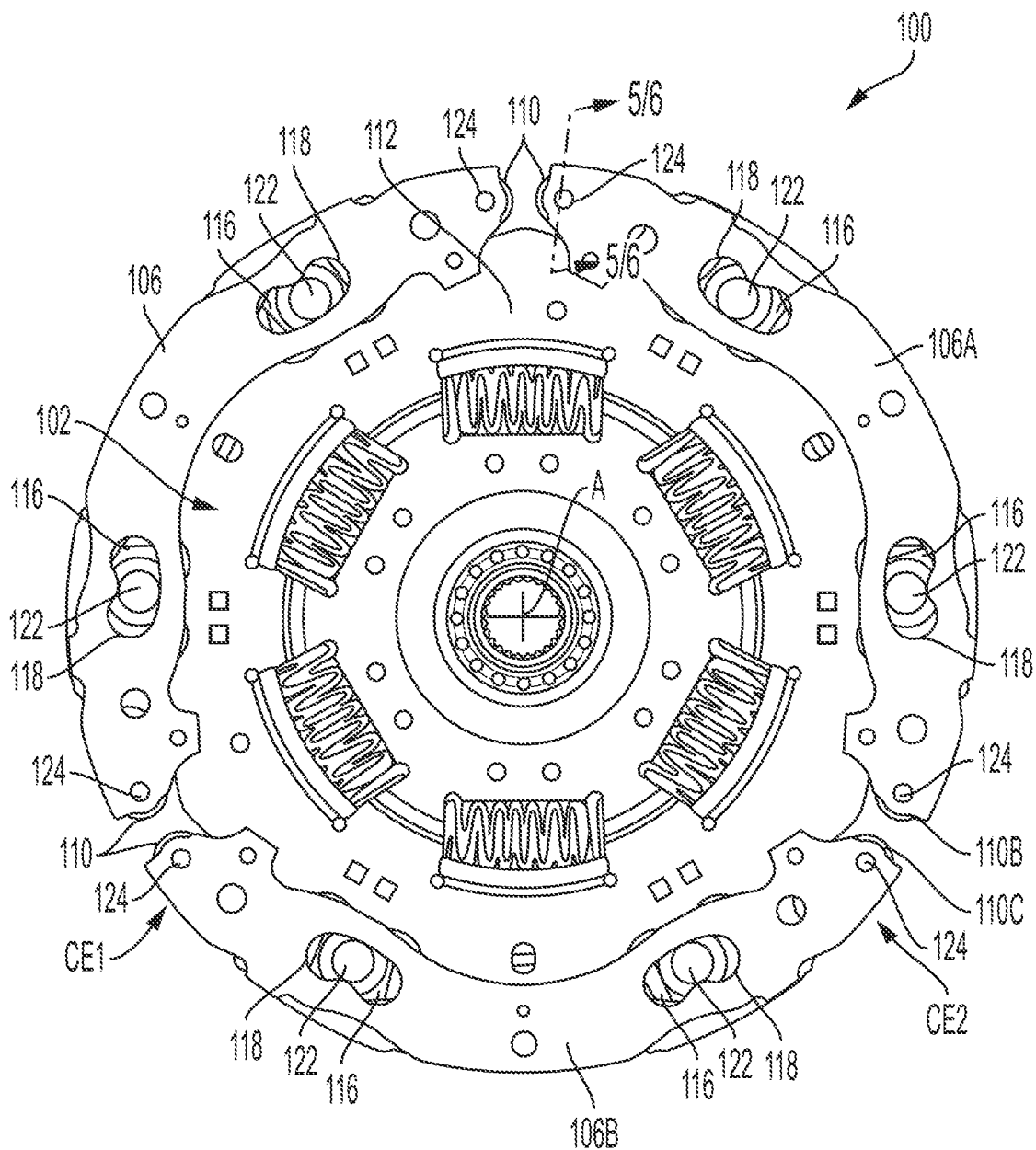
FIG. 2 illustrates a front view of the centrifugal pendulum absorber of FIG. 1.
Figure 3:
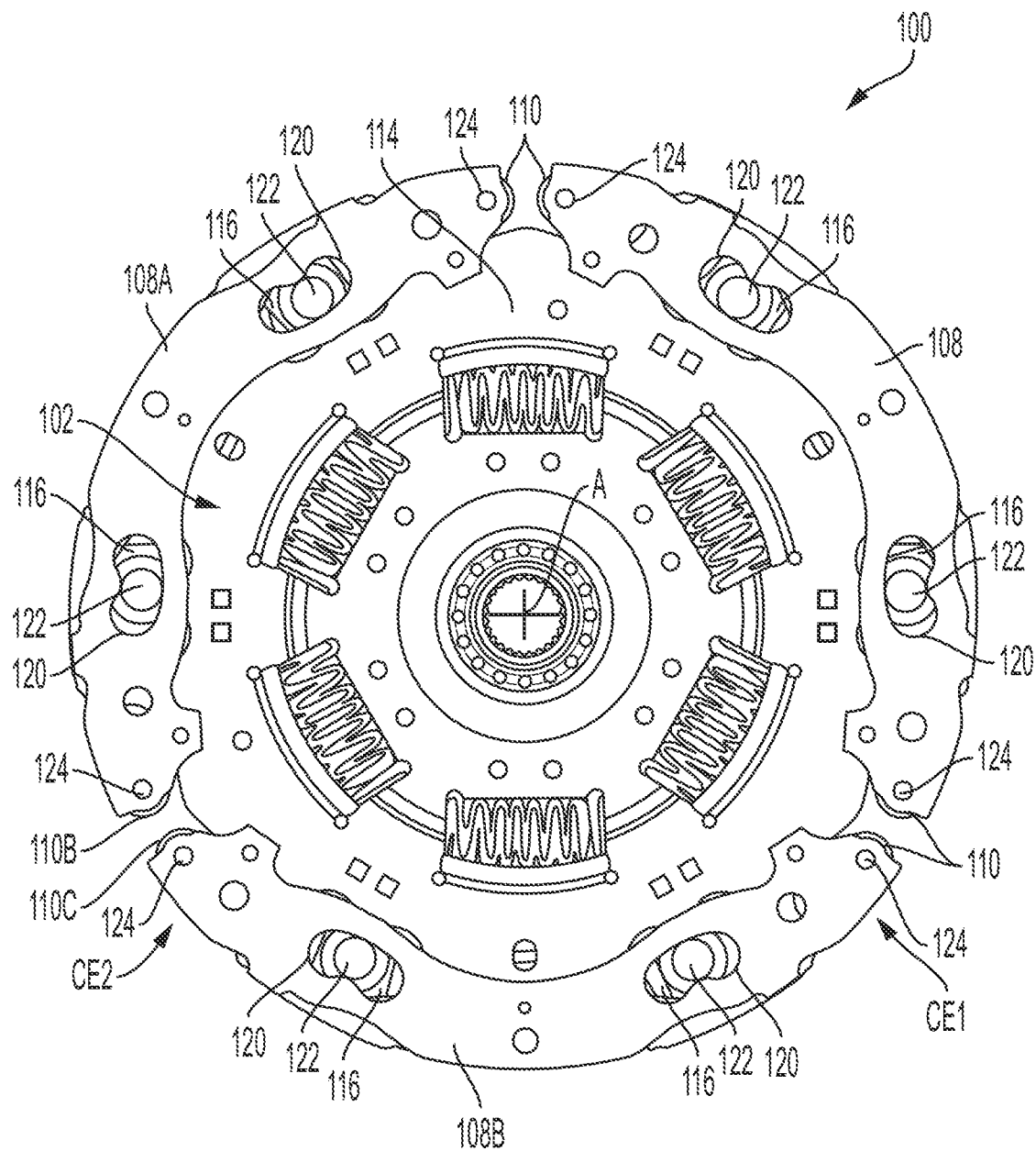
FIG. 3 illustrates a back view of the centrifugal pendulum absorber of FIG. 1.

Referring to FIGS. 1-3, a centrifugal pendulum absorber 100 is generally shown. At least some portions of the centrifugal pendulum absorber 100 are rotatable about an axis A. Words such as "axial," "radial," "circumferential," "outward," etc. as used herein are intended to be with respect to the axis A unless stated otherwise. The centrifugal pendulum absorber 100 includes: a center plate 102; pairs 104 of pendulum masses 106, 108; and resilient bumpers 110 connected to masses 106, 108.

The center plate 102 is arranged to receive a torque. The center plate 102 includes: a side 112 facing in an axial direction AD1 parallel to the axis A; and a side 114 facing in an axial direction AD2, opposite direction AD1. The pendulum masses 106 are disposed on the side 112 and the pendulum masses 108 are disposed on the side 114. That is, the pairs 104 axially bracket center plate 102. The center plate 102 may be a component of a vibration damper and include windows (not numbered) arranged to receive springs (not numbered).

The center plate 102 includes openings 116. Each mass 106 includes openings 118. Each mass 108 includes openings 120. The centrifugal pendulum absorber 100 includes rollers 122. Each roller 122 passes through a respective opening 116 and terminates in a respective opening 118 and a respective opening 120.

In reaction to rotation of center plate 102, the configuration of the rollers 122 in the openings 116, 118, and 120, enables radial and circumferential displacement of the masses 106, 108, with respect to the center plate 102, to absorb vibration associated with the rotation of the center plate 102. At times, the radial and circumferential displacement causes circumferentially adjacent pairs 104 of masses 106, 108 to displace toward each other. The resilient bumpers 110 are configured to prevent direct contact of the masses 106, 108 due to the displacement of the circumferentially adjacent pairs 104 toward each other. For example, when the masses 106A, 108A are displaced toward the masses 106B, 108B, the bumpers 110B and 110C contact each other to prevent direct contact of the masses 106A and 106B and of the masses 108A and 108B. In the discussion above and in the discussion that follows, capital letters are used to designate a specific component from a group of components otherwise designated by a three-digit number, for example, resilient bumper 110B is a specific example from among resilient bumpers 110.

The centrifugal pendulum absorber 100 includes fasteners 124 non-rotatably connecting pairs 104 of masses 106, 108. Each resilient bumper 110 is installed and disposed around a respective fastener 124. Each resilient bumper 110 is rotatable about the respective fastener 124. That is, the resilient bumpers 110 are rotatable relative to the center plate 102. Each pair 104 includes two resilient bumpers 110. One of the two resilient bumpers 110 is located proximate a circumferential end CE1 of the pair 104 and extends past the pair 104 in a circumferential direction CD1. The other of the two resilient bumpers 110 is located proximate a circumferential end CE2 of the pair 104 and extends past the pair 104 in a circumferential direction CD2, opposite direction CD1.

Figure 4:
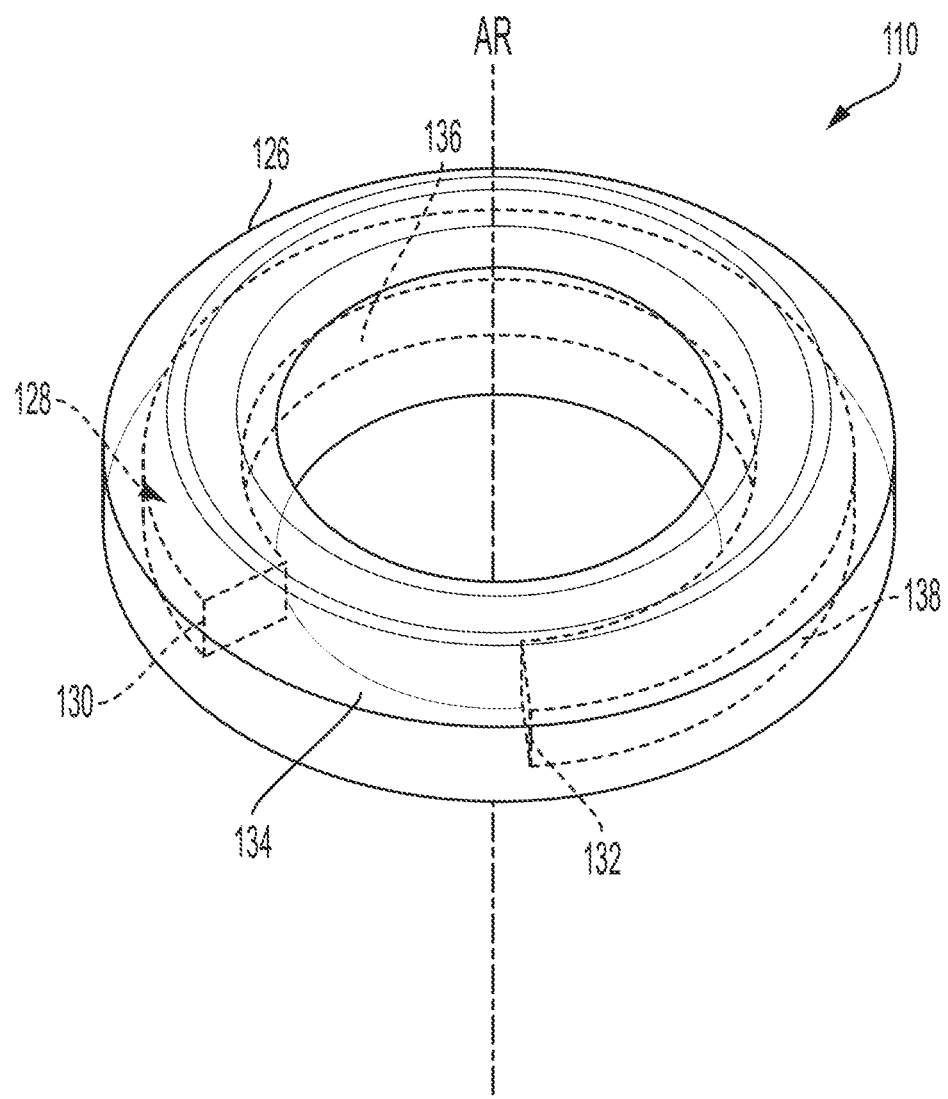
FIG. 4 illustrates a perspective view of the resilient bumper according to an example aspect of the present disclosure.

Referring to FIG. 4, the resilient bumper 110 includes a casing 126 and a core 128 enclosed by the casing 126. The casing 126 extends entirely about an axis of rotation AR parallel to the axis A. The casing 126 is formed by any suitable polymer, e.g., rubber, plastic, etc. The core 128 is formed by any suitable metal, e.g., steel. The resilient bumper 110 may be formed by insert injection molding techniques. That is, the core 128 is placed in a mold, and the casing 126 is injected into the mold surrounding and adhering to the core 128.

The core 128 includes a first end 130 and a second end 132 spaced from each other circumferentially about the axis of rotation AR. That is, the core 128 extends partially about the axis of rotation AR. The first end 130 and the second end 132 define a gap 134 therebetween. The casing 126 fills the gap 134. The gap 134 is configured to cause a center of mass of the core 128 to be radially offset relative to the axis of rotation AR. Additionally, the gap 134 is configured to permit limited deformation of the core 128 during an impact with another resilient bumper 110 to achieve desired impact absorption capabilities of the resilient bumper 110.

The core 128 includes an inner wall 136 and an outer wall 138. The inner wall 136 extends about the axis of rotation AR from the first end 130 to the second end 132. The inner wall 136 may be spaced from an inner diameter of the casing 126. In other words, the inner wall 136 may be radially outward of the inner diameter of the casing 126 relative to the axis of rotation AR. For example, the inner diameter of the casing 126 may contact the fastener 124, and the inner wall 136 may be spaced from the fastener 124.

The outer wall 138 extends about the inner wall 136 from the first end 130 to the second end 132. The outer wall 138 may be spaced from an outer diameter of the casing 126. In other words, the outer wall 138 may be radially inward of the outer diameter of the casing 126 relative to the axis of rotation AR. The core 128 may extend radially from the inner wall 136 to the outer wall 138 relative to the axis of rotation AR.

Figure 5:
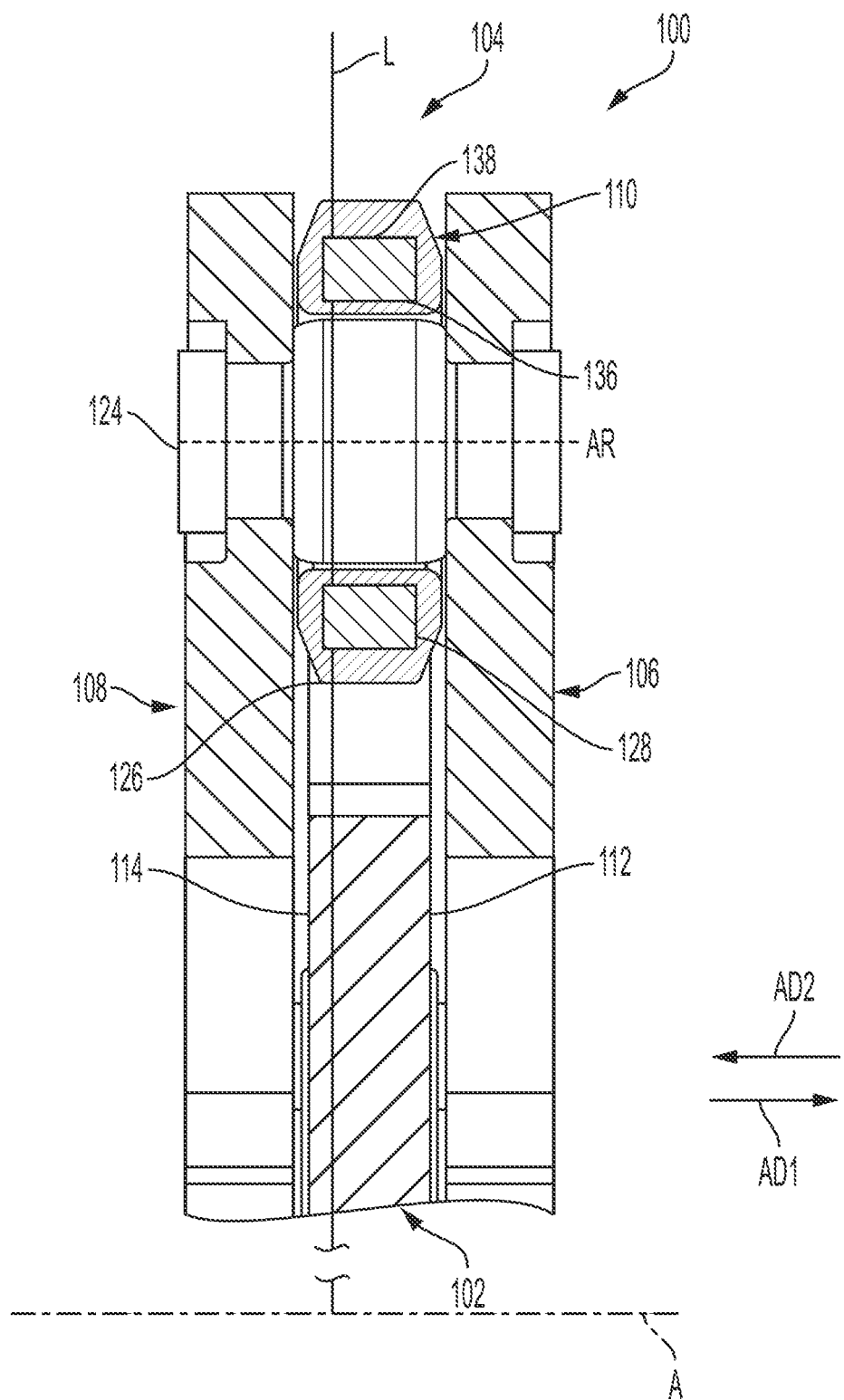
FIG. 5 is a cross-sectional view generally along line 5/6-5/6 in FIG. 2.

FIG. 5 is applicable to a condition in which the centrifugal pendulum absorber 100 is at rest or is rotating below a threshold speed. In this condition, the resilient bumpers 110 have not been distorted due to a centrifugal force linked to the rotation of the centrifugal pendulum absorber 100. Thus, the gap 134 may be arranged at any suitable position relative to the fastener 124. For example, the gap 134 may be, at least partially, circumferentially aligned with the fastener 124. In such an example, a portion of the core 128 is radially inward of and radially aligned with the fastener 124, and another portion of the core 128 is radially outward of and radially aligned with the fastener 124, as shown in FIG. 5. That is, a line L extending orthogonal to the axis A and from the axis A passes through, in sequence, the portion of the core 128, the fastener 124, and the other portion of the core 128 in a radially outward direction from the axis A. As another example, the gap 134 may be radially outward of and radially aligned with the fastener 124, i.e., the line L passes through, in sequence, the core 128, the fastener 124, and the gap 134 in the radially outward direction from the axis A. As yet another example, the gap 134 may be radially inward of the fastener 124, i.e., the line L passes through, in sequence, the gap 134, the fastener 124, and the core 128 in the radially outward direction from the axis A.

Figure 6:
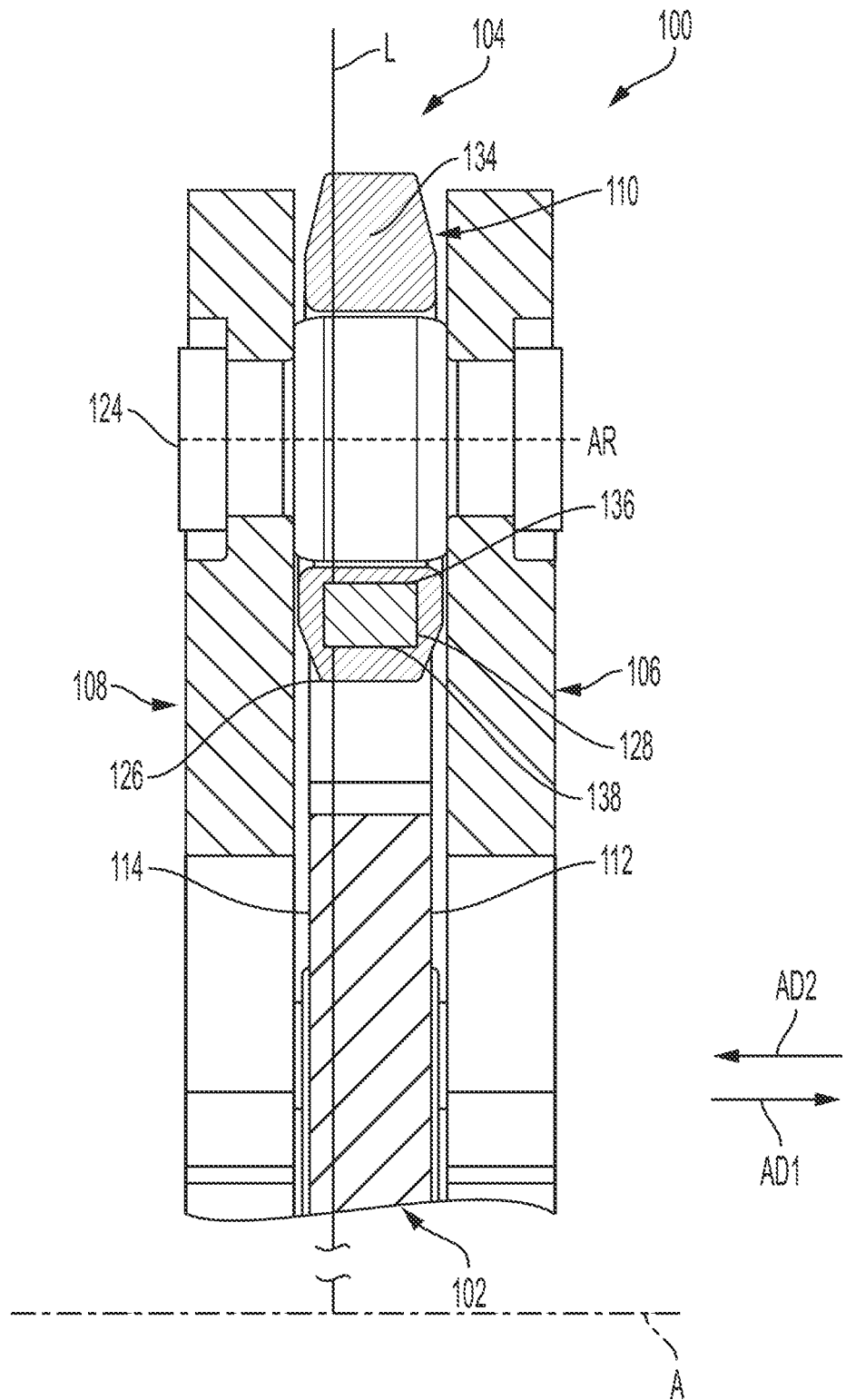
FIG. 6 is a cross-sectional view generally along line 5/6-5/6 in FIG. 2.

FIG. 6 is applicable to a condition in which the centrifugal pendulum absorber 100 is rotating at or above the threshold speed. In this condition, the centrifugal force linked to the rotation of the centrifugal pendulum absorber 100 has caused outward deflection of the resilient bumper 110 and, due to the configuration of the core 128, has caused the gap 134 to be arranged radially outward of the fastener 124. The core 128 limits outward deflection of the resilient bumper 110 and prevents strain on and damage to the resilient bumper 110 from excessive outward deflection. Additionally, the radial offset of the center of mass of the core 128 relative to the axis of rotation AR causes the gap 134 to be arranged radially outward of the fastener 124 when the centrifugal pendulum absorber 100 is rotating at or above the threshold speed. This arrangement permits deflection of the core 128 to correspond to deflection of the casing 126, which can assist in retaining the core 128 within the casing 126.

Figure 7:
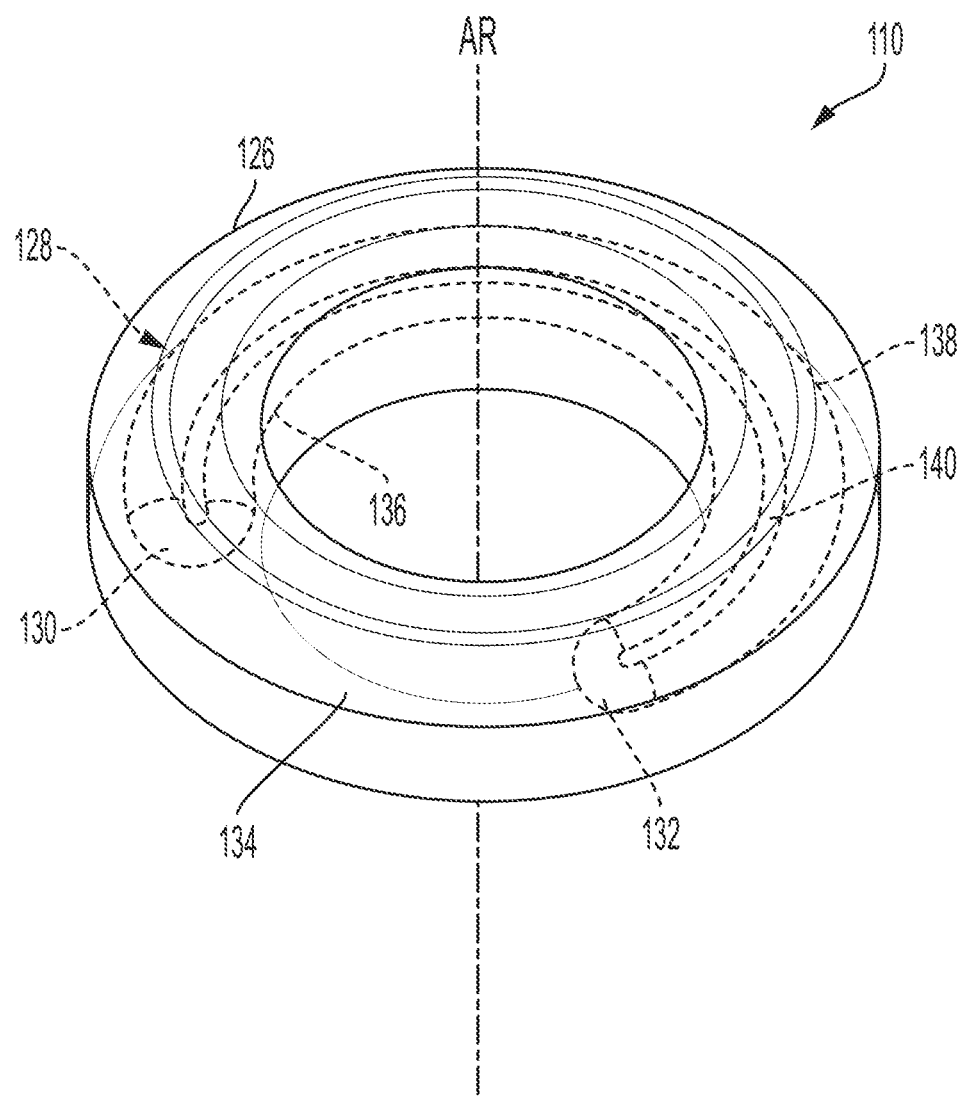
FIG. 7 illustrates a perspective view of the resilient bumper according to another example aspect of the present disclosure.

Referring to FIG. 7, an alternate embodiment for a resilient bumper 110 is provided. In contrast to FIG. 4, the core 128 includes a cavity 140 disposed radially between the inner wall 136 and the outer wall 138 relative to the axis of rotation AR. In other words, the core 128 is hollow. In the example embodiment shown in FIG. 7, the core 128 is formed by a wire.

The cavity 140 extends partially about the axis of rotation AR. The cavity 140 may be closed at the first end 130 and/or the second end 132 of the core 128. That is, the cavity 140 may be circumferentially spaced from the first end 130 and/or the second end 132 relative to the axis of rotation AR. In the example embodiment shown in FIG. 7, the casing 126 fills the cavity 140. Providing the cavity 140 between the inner and outer walls 136, 138 of the core 128 allows for reducing weight of the resilient bumpers 110 while increasing the durability and service life of the resilient bumpers 110.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

List of Reference Numbers
100 centrifugal pendulum absorber
102 center plate
104 pairs
106 pendulum mass
108 pendulum mass
110 resilient bumper
112 side
114 side
116 opening
118 opening
120 opening
122 roller
124 fastener
126 casing
128 core
130 end
132 end
134 gap
136 inner wall
138 outer wall
140 cavity
A axis
AR axis of rotation
AD1 axial direction
AD2 axial direction
CE1 circumferential end
CE2 circumferential end CD1 circumferential direction
CD2 circumferential direction
L line

What is claimed is:

1. A centrifugal pendulum absorber, comprising:
a center plate arranged to receive a torque;
a first pendulum mass and a second pendulum mass each connected to the center plate, the first and second pendulum masses axially bracketing the center plate;
a resilient bumper disposed between the first and second pendulum masses and connected to the first and second pendulum masses, the resilient bumper including a core enclosed by a casing, wherein the core is a metal and the casing is a polymer; and
a fastener fixedly connecting the first pendulum mass to the second pendulum mass, wherein the resilient bumper is disposed around the fastener;
wherein the casing extends entirely about the fastener, and the core extends partially about the fastener;
wherein the core includes a first end and a second end circumferentially spaced from each other about the fastener and defining a gap therebetween, the gap being configured to cause a center of mass of the core to be radially offset relative to an axis of rotation of the casing.

2. The centrifugal pendulum absorber of claim 1, wherein a portion of the casing fills the gap.

3. The centrifugal pendulum absorber of claim 1, wherein, when the center plate rotates beyond a threshold rotational speed, the gap is arranged radially outward with respect to the fastener, and the resilient bumper expands radially outwardly with respect to the fastener due to the center of mass of the core being radially offset relative to the axis of rotation of the casing.

4. The centrifugal pendulum absorber of claim 1, wherein the core includes:
an inner wall extending about the fastener;
an outer wall extending about the fastener and arranged radially outwardly of the inner wall with respect to the fastener; and
a cavity disposed between the inner wall and the outer wall, the cavity extending from one axial side of the core towards another axial side of the core.

5. The centrifugal pendulum absorber of claim 4, wherein the core includes a first end and a second end circumferentially spaced from each other about the fastener, the inner wall and the outer wall each extending from the first end to the second end, and the cavity being spaced from the first and second ends.

6. The centrifugal pendulum absorber of claim 4, wherein a portion of the casing fills the cavity.

7. A centrifugal pendulum absorber, comprising:
a center plate arranged to receive a torque;
a first pendulum mass and a second pendulum mass axially bracketing the center plate; and
a resilient bumper including a core enclosed by a casing, the core being a metal, and the casing being a polymer;
wherein
the resilient bumper is connected to the first pendulum mass and to the second pendulum mass and extends past the first pendulum mass in a circumferential direction; and
a fastener fixedly connecting the first pendulum mass to the second pendulum mass, wherein the resilient bumper is disposed around the fastener;
wherein the core includes:
an inner wall extending about the fastener;
an outer wall extending about the fastener and arranged radially outwardly of the inner wall with respect to the fastener; and
a cavity disposed between the inner wall and the outer wall, the cavity extending from one axial side of the core towards another axial side of the core.

8. The centrifugal pendulum absorber of claim 7, wherein
the casing extends entirely about the fastener, and the core extends partially about the fastener.

9. The centrifugal pendulum absorber of claim 8, wherein the core includes a first end and a second end circumferentially spaced from each other about the fastener.

10. The centrifugal pendulum absorber of claim 9, wherein the first end and the second end define a gap therebetween, the gap being configured to cause a center of mass of the core to be radially offset relative to an axis of rotation of the casing.

11. The centrifugal pendulum absorber of claim 10, wherein, when the center plate rotates beyond a threshold rotational speed, the gap is arranged radially outward with respect to the fastener, and the resilient bumper expands radially outwardly with respect to the fastener due to the center of mass of the core being radially offset relative to the axis of rotation of the casing.

12. The centrifugal pendulum absorber of claim 7, wherein the core includes a first end and a second end circumferentially spaced from each other about the fastener, the inner wall and the outer wall each extending from the first end to the second end, and the cavity being spaced from the first and second ends.

13. A resilient bumper for a centrifugal pendulum absorber, comprising:
a casing configured to extend entirely around a fastener, wherein the casing is a polymer; and
a core enclosed by the casing and configured to extend partially around the fastener, wherein the core is a metal;
wherein the core includes a first end and a second end circumferentially spaced from each other about the fastener and defining a gap therebetween, the gap being configured to cause a center of mass of the core to be radially offset relative to an axis of rotation of the casing.

14. The resilient bumper of claim 13, wherein a portion of the casing fills the gap.

15. The resilient bumper of claim 13, wherein the core includes:
an inner wall configured to extend about the fastener from the first end to the second end;
an outer wall configured to extend about the fastener from the first end to the second end and arranged radially outwardly of the inner wall with respect to the fastener; and
a cavity disposed radially between the inner wall and the outer wall with respect to the fastener, the cavity extending from one axial side of the core towards another axial side of the core.

16. The resilient bumper of claim 15, wherein a portion of the casing fills the cavity.

17. The resilient bumper of claim 13, wherein, when the resilient bumper rotates beyond a threshold rotational speed, the gap is arranged radially outward with respect to the fastener, and the resilient bumper expands radially outwardly with respect to the fastener due to the center of mass of the core being radially offset relative to the axis of rotation of the casing.

\* \* \* \* \*